United States Patent [19]

Nakamura et al.

[11] Patent Number: 4,845,710
[45] Date of Patent: Jul. 4, 1989

[54] DYNAMIC BUFFER SUPERVISING SYSTEM FOR A DATA LINK ACCESS PROTOCOL CONTROL

[75] Inventors: Tamiya Nakamura; Hiroshi Bamba; Toru Furuhashi; Takaaki Ozeki; Kuniaki Kishino; Toshihiko Inagaki, all of Tokyo, Japan

[73] Assignee: Oki Electric Industry Co., Ltd., Tokyo, Japan

[21] Appl. No.: 127,502

[22] Filed: Dec. 1, 1987

[30] Foreign Application Priority Data

Dec. 23, 1986 [JP] Japan .................. 61-305171
Dec. 26, 1986 [JP] Japan .................. 61-308667
Feb. 26, 1987 [JP] Japan .................. 62-41469

[51] Int. Cl.$^4$ .................................. H04J 3/02
[52] U.S. Cl. .................................. 370/110.1; 370/58
[58] Field of Search .............. 370/110.1, 94, 95, 58, 370/60, 61

[56] References Cited

U.S. PATENT DOCUMENTS

| | | | |
|---|---|---|---|
| 3,922,497 | 11/1975 | Artom et al. | 370/61 |
| 4,611,321 | 9/1986 | Gabrielli et al. | 370/60 |
| 4,730,305 | 3/1988 | Acampora et al. | 370/60 |
| 4,755,992 | 7/1988 | Albal | 370/110.1 |

OTHER PUBLICATIONS

H. Takamura et al., "A Study on Buffer Control for ISDN Switching System", The Institute of Electronics and Communication Engineers of Japan, Technical Report SE86-56, pp. 43–48 (1986).
T. Nakamura et al., "I–Interface Signalling Equipment and the Method of Verification & Estimation of Them", General Conference of the 70th Anniversary of The Institute of Electronics and Communication Engineers of Japan, No. 1850, (1987).

Primary Examiner—Douglas W. Olms
Assistant Examiner—Min Jung
Attorney, Agent, or Firm—Wenderoth, Lind & Ponack

[57] ABSTRACT

In a communication apparatus of the type performing ISDN LAPD signal processing, the assignment of buffers each for temporarily storing a received data signal is supervised. Idle buffers are reserved in a common idle buffer pool while transmit buffers and receive buffers are supervised for each of service access points. The number of buffers awaiting processing or transmission is monitored at each predetermined period, on the identifier basis. As the number of idle buffers reserved in the idle buffer pool decreases to a value which is less than a predetermined value, the idle buffer assignment allowable for processing is restricted in number on the service access point basis and in a matching relationship to a function of the current number of waiting buffers and a predetermined threshold value. The restriction may be provided with a plurality of different levels, in which case a restriction level border value for a transition in a restriction tightening direction is selected to be smaller than that for a transition in a restriction relaxing direction with respect to the number of idle buffers. The number of idle buffers and the restriction level border value may each be defined per unit time.

13 Claims, 14 Drawing Sheets

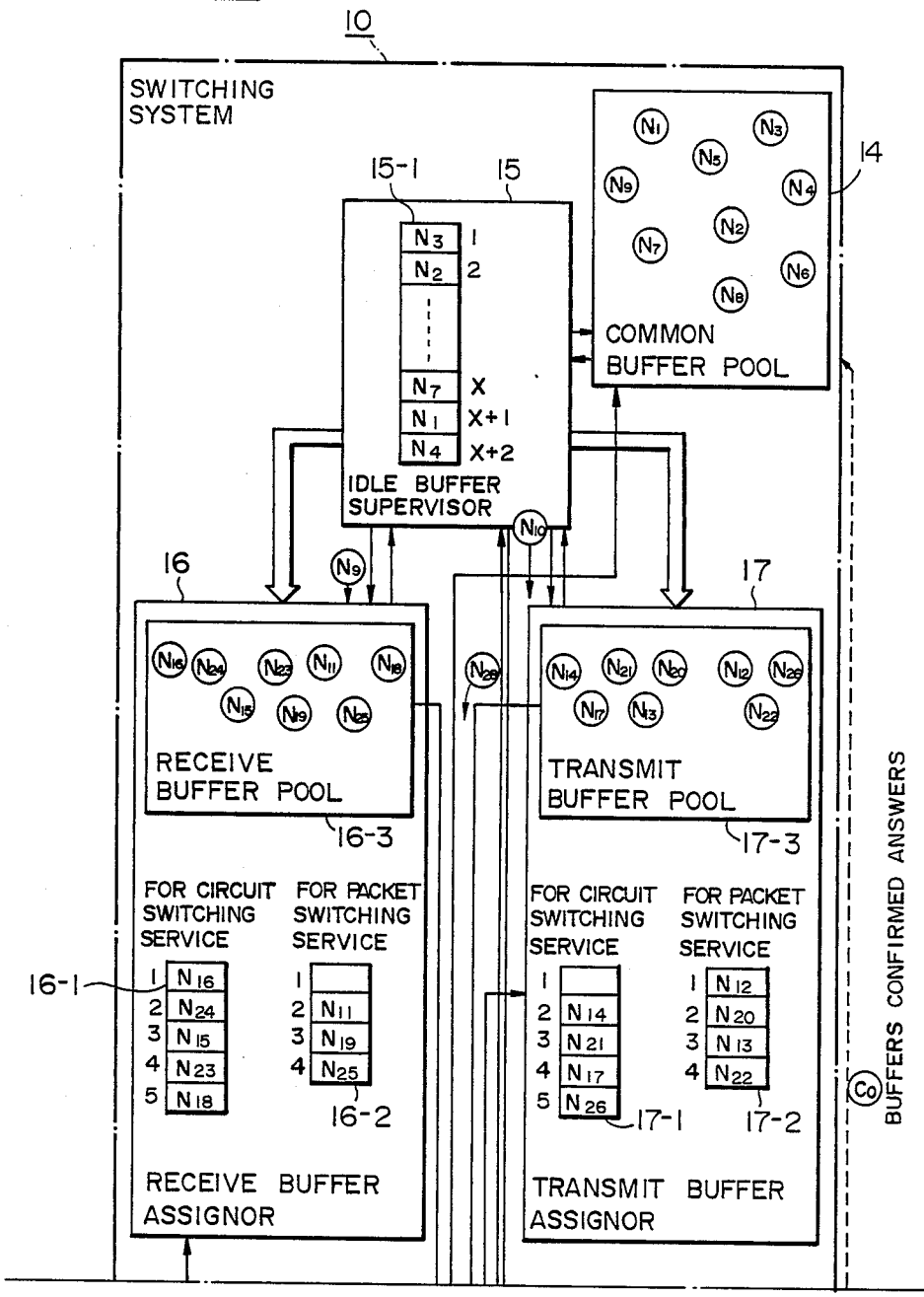

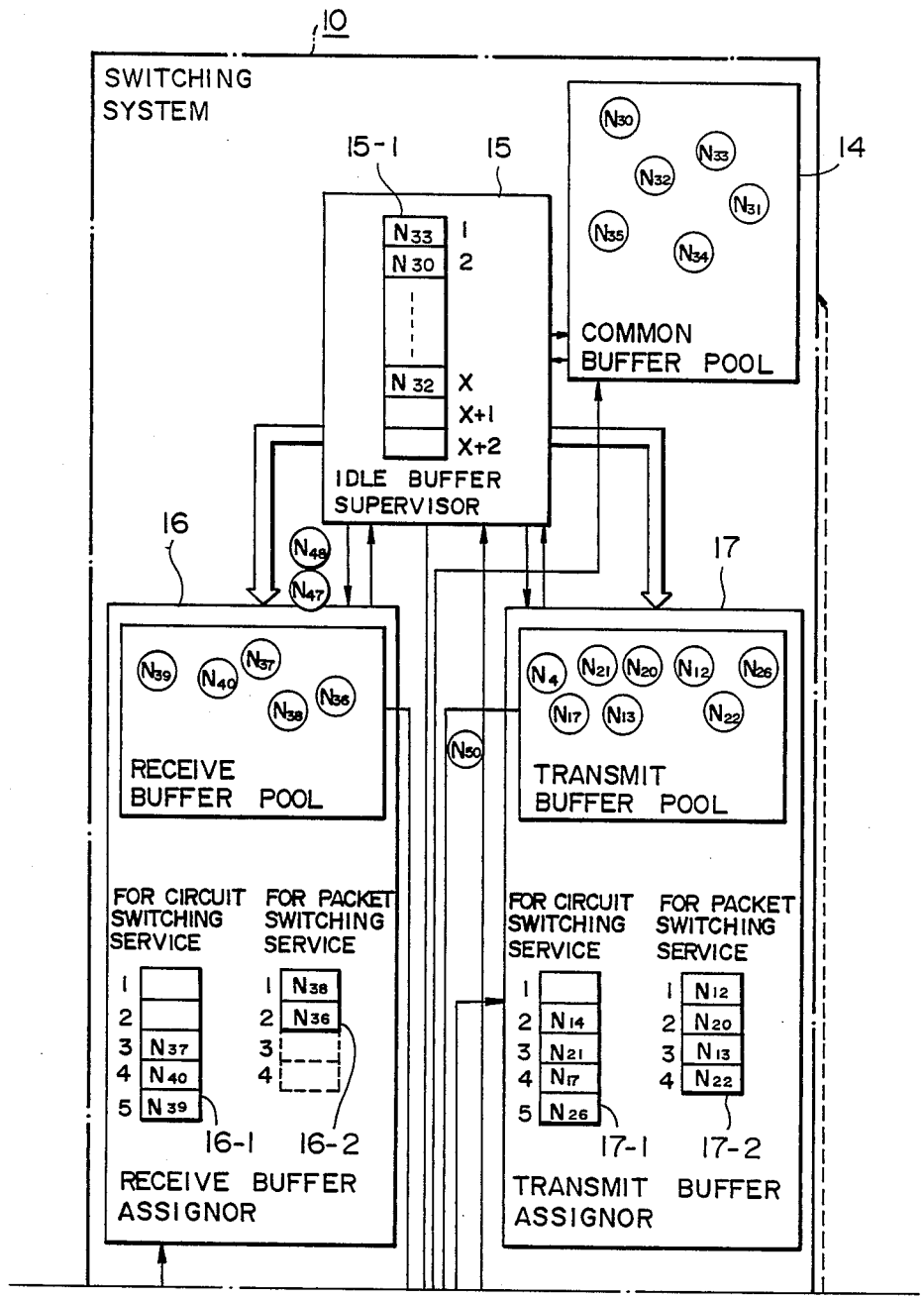

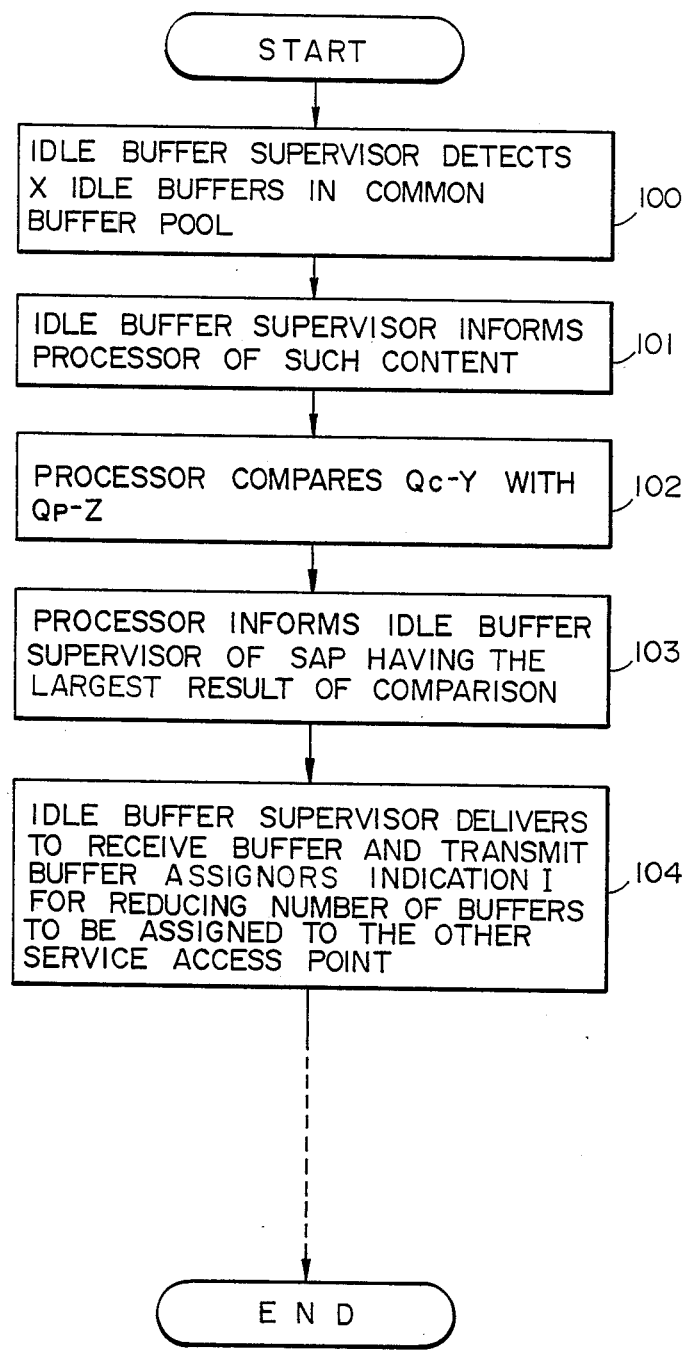

FIG. 10

| NUMBER OF IDLE BUFFERS (B) | RESTRICTED NUMBER OF RECEIVE BUFFERS ($\frac{mci}{mpi}$) | | NOTICE TO TERMINAL | | NOTICE TO UPPER LAYER STATION | |
|---|---|---|---|---|---|---|
| | RESTRICTION TIGHTENING LEVEL | RESTRICTION RELAXING LEVEL | CIRCUIT SWITCHING | PACKET SWITCHING | CIRCUIT SWITCHING | PACKET SWITCHING |
| max ≀ z+1 | NORMAL (r=0) (mco, mpo) | NORMAL r=0 (mco, mpo) | | SEND RR | | CANCEL BUSY |
| z ≀ y+1 | | 1ST RESTRICTION (r=1) (mcı, mpı) | SEND RR | RR ↓ ↑ RNR | CANCEL BUSY | CANCEL BUSY ↓ ↑ BUSY |
| y ≀ x+1 | 1ST RESTRICTION (r=1) (mcı, mpı) | | | SEND RNR | | BUSY |
| x ≀ w+1 | | 2ND RESTRICTION (r=2) (mc2, mp2) | RR ↓ ↑ RNR | | CANCEL BUSY ↓ BUSY | BUSY |
| w ≀ 0 | 2ND RESTRICTION (r=2) (mc2, mp2) | | SEND RNR | | BUSY | |

FIG. 11

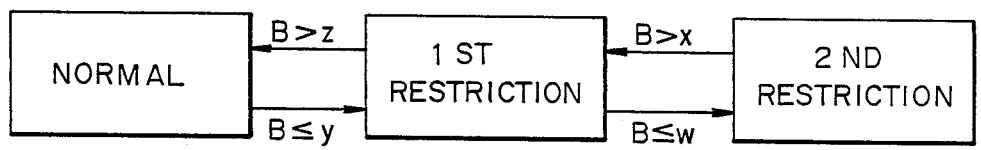

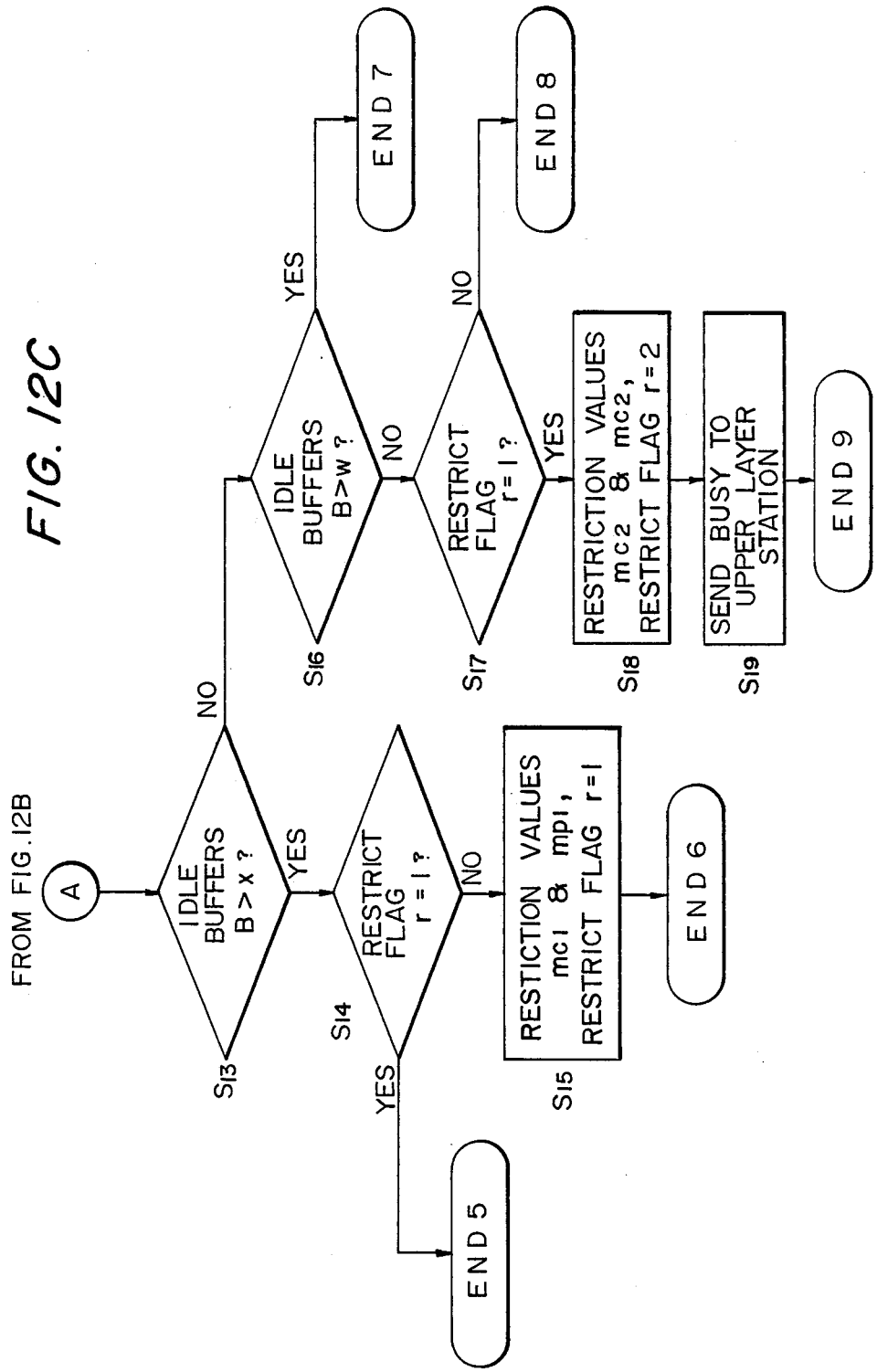

DYNAMIC BUFFER SUPERVISING SYSTEM FOR A DATA LINK ACCESS PROTOCOL CONTROL

BACKGROUND OF THE INVENTION

1. Field of the Invention

The present invention relates to a switching system and, more particularly, to a control system installed in a D channel data link access protocol (LAPD) signal processor for supervising buffers which are adapted to individually temporarily store data signals therein. The LAPD signal processor with which the present invention is concerned is defined by International Telegraph and Telephone Consultative Committee (CCITT) Recommendations pertaining to the Integrated Services Digital Network (ISDN) user-network interface.

2. Description of the Prior Art

For the supervision of buffers provided in an ISDN switching system, some different approaches are available such as one which assigns a different receive queue to each data transmitted by a packet switching service and data transmitted by a circuit switching service, and one which does not discriminate between those two different kinds of data and, instead, monitors at layer 3 the lengths of queues that are awaiting transmission on individual D channels, on a channel-by-channel basis. The first-mentioned approach, or individual queue system, is disclosed in, for example, Takamura et al. "Study of Buffer Control System for ISDN Switching System," The Institute of Electronics and Communication Engineers of Japan, Technical Report SE86-56, pp. 43-48, 1986.

The principle of the individual queue system mentioned above is shown in FIG. 4 of the accompanying drawings. As shown, when a layer 3 processing section (CP$^3$) takes in received signals, a different receive queue is assigned to each of packet switching service and circuit-switching service for each of a plurality of layer 2 processing sections (CPi$^2$). In FIG. 4 and others, let arc representative of circuit-switched data signals and dots be representative of packet-switched data signals. As regards the assignment of buffers, priority is controlled by admitting a limited number of data signals from each of those queues at a period of t, for each of the circuit switching service and packet switching service. In receive processing, for example, the maximum number of signals which are derived from circuit switching service and can be admitted within the period t is selected to be greater than or at least equal to that of signals which are derived from packet switching service. Stated another way, circuit switching service data have priority over packet switching service data with respect to the assignment of buffers.

FIG. 5 illustrates the principle of the second-mentioned prior art control system in which the lengths of waiting queues are monitored at layer 3 for each D channel without discriminating between circuit switching and packet switched service data. As shown, the principle is such that circuit switching service data and packet switched service data are bracketed together and, once the waiting queue on any of the D channels exceeds a predetermined length, additional packet switching service on that channel is inhibited from being set up. Specifically, the system limits the total number of signals which can be admitted, instead of discriminating between circuit switching service data and packet switching service data with respect to the frequency of transmission on one D channel. To prevent buffers at any particular terminal equipment from being reserved for a long period of time, the system defines two different threshold values: a basic queue length N1 adapted for restriction, and a cancel queue length N0 which is shorter than the basic queue length N1 and adapted to cancel the restriction. The flow of packets toward the D channel is restricted when the actual queue length on the D channel becomes longer than the threshold value N1, and the restriction is cancelled when it becomes shorter than the other threshold value N0. As soon as the period of time during which the queue length on any D channel remains greater than the threshold value N1 exceeds a predetermined one, that channel is made busy.

Meanwhile, the assignee's copending Japanese patent application No. 72812/1985 proposes a system for eliminating the increase in the delay time of data which is ascribable to, for example, high calling rates of circuit switching service or packet switching service data due to the shortage of idle buffers which may be assigned to a receiving section. Specifically, the proposed system controls the number of buffers to be assigned to transmission and/or reception, depending upon the number of idle buffers which are available in a common buffer pool. As the number of idle buffers becomes smaller than a predetermined value, the number of buffers to be assigned to transmission and/or reception is cut down.

Another approach for the supervision of buffers in packet switching is disclosed in "Primary Study of DDX-2 Packet Switching System," Nippon Telegraph & Telephone Public Corporation, Study and Practical Use Report Vol. 26, No. 8, pp. 2383-2397. A packet switching system in accordance with this approach includes some buffers which are provided in a common buffer pool, and exclusive idle buffers for reception which are provided in a receive buffer pool and assigned to individual service access points.

In detail, when a receiving section receives data signals which are transmitted from various service access points such as packet switching service terminal equipment and other stations, or offices, it requests buffers for storing individual data. In response to this request, idle buffers in the receive buffer pool are assigned while, at the same time, an idle buffer request is applied to the common buffer pool to secure idle buffers. As the idle buffers are assigned, the receiving section stores the data signals originated by the individual service access points in their associated idle buffers. Upon completion of the reception, the information are sequentially lodged in their associated queues in the form of process waiting buffers, waiting for processing.

A processor takes in the waiting buffers from the queues, then analyzes destinations and other parameters of the data signals, and then sequentially stores them in their associated transmit queues in the form of transmit waiting buffers which individually correspond to the service access points for the destinations. If more than a predetermined number of transmit waiting buffers are present, the excess buffers are discarded as waste buffers. The discarded buffer areas are pooled in the common buffer pool.

A transmitting section sequentially takes out the transmit waiting buffers from the individual transmit queues and transmits the data signals stored in the respective buffer areas to terminal equipment, stations or offices, and other service access points for which the data signals are meant. The transmit acknowledging waiting buffers which are now idle wait for answers from their associated service access points. Upon arrival of an answer, each of the transmit acknowledging waiting buffers is returned to the common buffer pool to be reserved therein as an idle buffer.

Other buffer supervising systems for packet switching are described in "Area Congestion Control in Traffic Control System," National Convention of the Institute of Electronics & Communication Engineers of Japan, Communications Section, Vol-178, 1982, and "Traffic Control Algorithm for Packet Switching Network," Nippon Telegraph and Telephone Corporation, Study & Practical Use Report Vol. 35, No. 5, pp 53–61.

The system elaborated for congestion control as stated above performs restriction at a plurality of different levels based on the correlation between standard values of the ratio of a duration for which all the incoming trunk circuits are busy and those of the ratio of a duration for which all the hopper transaction memories, or buffers, are busy. The restriction is effected and cancelled by using the same threshold values.

On the other hand, the second-mentioned system applies congestion control having a plurality of levels to packet switching service data on the basis of correlation between the occupation rate of a processor and that of buffers.

SUMMARY OF THE INVENTION

It is, therefore, an object of the present invention to provide a buffer supervising system which performs effective traffic control in an LAPD signal processor for ISDN.

More specifically, an object of the present invention is to provide a buffer assigning system capable of preventing the delay time from being increased even between those stations which are strictly conditioned in transmission and reception time.

In accordance with the present invention, a system for supervising assignment of buffers for individually storing data signals which are transmitted to and received from a communication apparatus of a type performing D channel data link access protocol signal processing as defined by CCITT Recommendations pertaining to a user-network interface of an integrated service digital network includes processing means for processing the data signals each of which is temporarily stored in respective one of the buffers, first buffer assigning means for assigning receive buffers, which individually temporarily store received data signals which wait until processed by the processing means, to those received data signals for each of identifiers of service access points, second buffer assigning means for assigning transmit buffers, which individually temporarily store data signals which have been processed by the processing means and wait until transmitted, to those processed data signals for each of the identifiers of the service access points, idle buffer reserving means shared by the first and second buffer assigning means for reserving idle buffers therein, and supervising means for supervising the number of buffers to be assigned by the first buffer assigning means and the number of buffers to be assigned by the second buffer assigning means depending upon the number of idle buffers which are reserved by the idle buffer reserving means. The processing means monitors the numbers waiting buffers at each predetermined period for each of identifiers of the service access points and, when the supervising means has detected that the number of idle buffers reserved by the idle buffer reserving means has decreased to less than a first predetermined value, controls the assigned numbers of idle buffers which are to be accepted on a service access point basis, depending upon a function of a current number of waiting buffers and a predetermined threshold value.

The supervising means supervises the number of idle buffers reserved in the idle buffer reserving means. The processing means calculates a function of the number of currently waiting buffers and a predetermined threshold value based on the increase and decrease of the number of idle buffers with respect to a predetermined value and, depending upon the resulting function, determines the assigned number of idle buffers which is to be accepted for processing for each service access point. The result is delivered from the processing means to the first and second buffer assigning means via the supervising means. In response, the first and second buffer assigning means dynamically changes, respectively the number of receive buffers and that of transmit buffers to be assigned.

In accordance with the present invention, in a system for supervising the number of assigned buffers for individually temporarily storing data signals which are transmitted to and received from each of a plurality of terminal equipment which are connected to data link access protocol control, there are provided independent counters each for counting, based on a service access point for individual terminal equipment, associated one of the numbers of buffers per unit period of time which were used for storing the data signals associated with the terminal equipment, receive buffer assigning means for defining an upper limit of the associated number of assigned buffers which corresponds to the unit time, and comparing means for comparing the number of used buffers with the associated upper limit. When any of the numbers of used buffers has reached its associated upper limit, the storage of data signals associated with the service access point into the buffers is inhibited.

Further, in accordance with the present invention, in a system for supervising the number of assigned buffers for individually temporarily storing data signals which are transmitted to and received from each of a plurality of terminal equipment which are connected to a data link access protocol signal processor, there are provided idle buffer supervising means for supervising the numbers of idle buffers per unit period of time which are usable for storing the data signals which are individually associated with the terminal equipment, and restriction setting means for setting, on a service group basis and based on correspondence to a predetermined number of idle buffers of a plurality of levels, a restriction value for restricting the numbers of receive buffers per unit time necessary for the reception of data signals from the terminal equipment. The border value for the transition from one level to another is selected to be smaller for a restriction tightening direction than for a restriction relaxing direction with respect to the number of idle buffers.

In accordance with the present invention, each level of the restriction value of the number of receive buffers is determined based on the number of idle buffers which are supervised by the idle buffer supervising means. While the restriction advances to a tighter stage upon the decrease in the number of idle buffers and to a more relaxed stage upon the increase of the same, the transition to the tighter stage does not occur unless the number of idle buffers smaller than that associated with the transition to the more relaxed stage is reached. The restriction values of the different levels are predetermined on a service group basis, so that the traffic of each service group is controlled independently of the others.

BRIEF DESCRIPTION OF THE DRAWINGS

The objects and features of the present invention will become more apparent from the consideration of the following detailed description taken in conjunction with the accompanying drawings in which:

FIG. 1 consists of FIG. 1A and FIG. 1B.

FIGS. 1A and 1B, when combined as shown in FIG. 1, are schematic block diagrams showing, in combination, a switching system to which a buffer supervising system embodying the present invention is applied;

FIG. 2 consists of FIG. 2A and FIG. 2B.

FIGS. 2A and 2B, when combined as shown in FIG. 2, are schematic block diagrams showing, in combination, the switching system of FIG. 1 under a condition wherein a particular indication has been generated;

FIG. 3 is a flowchart demonstrating an exemplary sequence of steps for reducing the number of idle buffers assigned in the system of FIG. 1;

FIG. 10 is a chart useful for understanding the conditions for restricting receive buffers which are included in the embodiment of FIG. 9;

FIG. 11 is a view schematically showing transitions between different stages of restriction; and FIGS. 12A, 12B and 12C are flowcharts exemplarily demonstrating, in combination, the operation of the circuit of FIG. 9 for controlling the number of receive buffers.

DESCRIPTION OF THE PREFERRED EMBODIMENTS

Figure 1B:
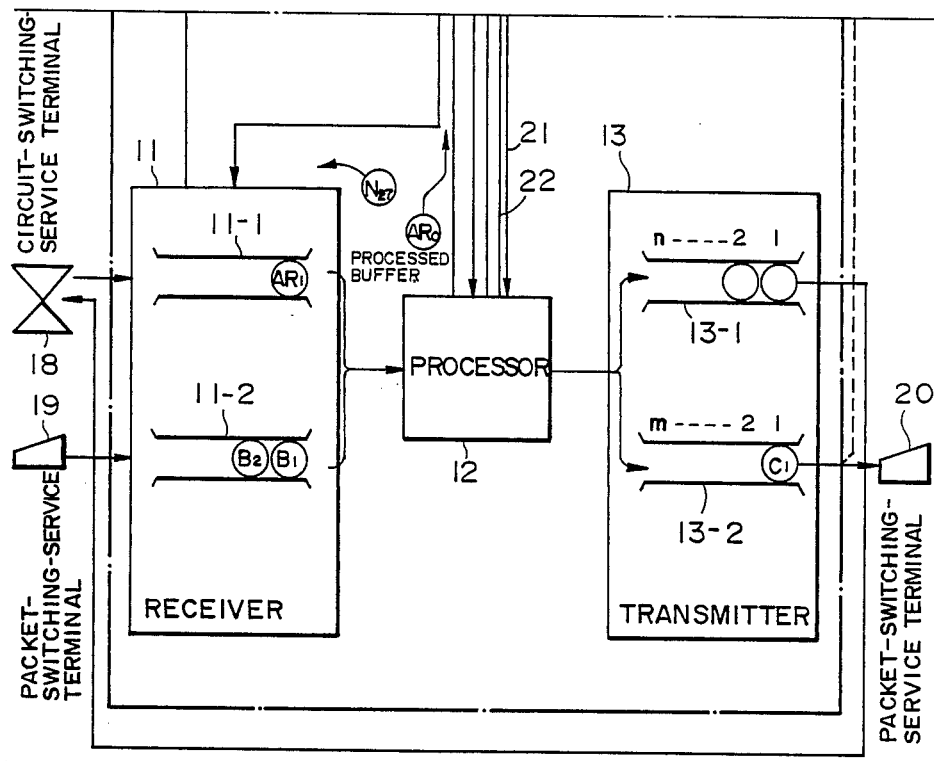

Referring to FIGS. 1A and 1B, a switching system to which a buffer supervising system of the present invention is applied is shown and generally designated by the reference numeral 10. The switching system 10 executes LAPD signal processing as defined by CCITT Recommendations pertaining to an ISDN user-network interface, i.e. integrated circuit switching and packet switching service.

As shown, the switching system 10 accommodates a terminal 18 which belongs to a certain service group, and terminals 19 and 20 which belong to another service group. While terminal 18 serves as a circuit-switching-service-oriented terminal for transmitting and receiving circuit switching service data, each of the terminals 19 and 20 serves as a packet-switching-service-oriented terminal for transmitting and receiving packet switching service data. In this particular embodiment, the circuit-switching-service-oriented terminal 18 and the packet-switching-service-oriented terminals 19 and 20 each has a function of transmitting and receiving data signals based on the ISDN LAPD protocol. As well known in the art, the terminal 18 is relatively strictly conditioned with respect to the effective data transfer time, i.e. real time data transfer. On the other hand, the condition imposed on the terminals 19 and 20 with respect to the same factor is relatively relaxed and even allows a substantial transfer delay. While a plurality of such terminals are accommodated in practice, only a single circuit-switching-service-oriented terminal 18 and two packet-switching-service-oriented terminals 19 and 20 are shown in the figure for the sake of simplicity.

The switching system 10 includes a receiving section 11 which serves as an interface for receiving data signals that are transmitted over transmission lines from the circuit-switching-service-oriented terminal 18 and the packet-switching-service-oriented terminal 19. Also included in the switching system 10 is a transmitting section 13 to which reception lines of the terminals 18 and 19 are connected, serving as an interface for transmitting data signals to the terminals 18 and 19. As shown, receive queues 11-1 and 11-2 for the terminals 18 and 19, respectively, are defined in the receiving section 11. The receive queue 11-1 is adapted to hold process waiting buffers each temporarily storing a data signal which is received from the terminal 18, e.g. a buffer AR1. Likewise, the received queue 11-2 is adapted to hold process waiting buffers each temporarily storing a data signal which is received from the terminal 19, e.g. a buffers B1. In this particular embodiment, a different queue such as the queue 11-1 or 11-2 is defined for each of service access points such as the terminals 18 and 19, as stated above. This is true with the transmitting section 13 also. The queues 11-1 and 11-2 are scanned by a processing unit 12 at a predetermined period t, so that the process waiting buffers are sequentially fed to the processing unit, or processor, 12 in the waiting order.

Represented by circled numerals in FIGS. 1A, 1B, 2A and 2B, buffers are each constituted by a storage area for temporarily storing a data signal arrived a the receiving section 11 until it is fed to the processor 12, or for temporarily storing a data signal coming out of the processor 12 until it is transmitted from the transmitting section 13. As will be described in detail later, idle buffers shared by the receiving section 11 and transmitting section 13 are reserved in a common pool buffer 14, exclusive idle buffers assigned to the receiving section 11 are reserved in an receive buffer pool 16-3, and exclusive buffers assigned to the transmitting section 13 are reserved in a receive buffer pool 17-3. The storage capacities of those buffers are selected to be either equal to or different from each other as the case may be.

The processor 12 plays the role of a central control unit for controlling the entire switching system. Specifically, functions assigned to the processor 12 include taking out the buffers held in the queues 11-1 and 11-2 of the receiving section 11 one at a time and in the appropriate order and, after applying necessary processing to the data signal of the buffer, storing the data signal in a transmit waiting queue of the transmitting section 13, and controlling the service access point originating traffic associated with each of the circuit switching and packet switching service terminals by performing calculation for the control of idle buffers, which will be described.

The receive buffers AR1, B1 and others are assigned by an receive buffer assigning section 16. When the processor 12 is to process data signals applied thereto from the terminals 18 and 19, the assigning section 16 serves to supply the receiving section 11 with buffers for individually receiving and temporarily storing the data signals. The receive buffer pool 16-3 is provided in the assigning section 16 and usually reserves therein a buffer N11 and other idle buffers. The idle buffers held in the receive buffer pool 16-3 are supervised by buffer assignment tables 16-1 and 16-2. Specifically, the buffer assignment table 16-1 is adapted to manage idle buffers which should be assigned to the circuit-switching-service-oriented terminal 18 such as an idle buffer N16, and the buffer assignment table 16-2 is adapted to manage idle buffers which should be assigned to the packet-switching-service-oriented terminal 19 such as an idle buffer N11. In this embodiment, the tables 16-1 and 16-2 are each configured such that the number of buffers which may be assigned is variable in response to an indication I applied thereto from an idle buffer supervising section 15.

The idle supervising section 15 is provided with an idle buffer supervision table 15-1 for managing the number of idle buffers in the common buffer pool 14. The common buffer pool 14 serves a common buffer reserving function for pooling an idle buffer N1 and others each of which is adapted to temporarily store a process waiting data signal. Monitoring the number of idle buffers in the common buffer pool 14, the supervising section 15 alerts the processor 12 when the number of those idle buffers is reduced to less than a predetermined number X. Another function assigned to the supervising section 15 is, in response to an instruction from the processor 12, delivering to the receive buffer assigning section 16 or a transmit buffer assigning section 17 the indication I for reducing the number of buffers, which may be assigned, in the variable buffer assignment tables 16-1 and 16-2 of the receive buffer assigning section 16 or variable buffer assignment tables 17-1 and 17-2 of the transmit buffer assigning section 17. Details of this function will be described in detail later.

The transmitting section 13 is provided with transmit queues 13-1 and 13-2 which are associated with the circuit-switching-service-oriented terminal 19, respectively. The queue 13-1 is adapted to hold process waiting buffers each temporarily storing a data signal which is to be sent to the terminal 18. Likewise, the queue 13-2 is adapted to hold a process waiting buffer C1 and others each temporarily storing a data signal which is to be sent to the terminal 20. These transmit queues 13-1 and 13-2, too, are scanned by the processor 12 at the period t, whereby their lengths are monitored.

The transmit buffers C1 and others are assigned by the transmit buffer assigning section 17. When the processor 12 is to send data signals to the terminal 18 or 19, the transmit buffer assigning section 17 serves to feed to the transmitting section 13 buffers for temporarily storing those data signals. The transmit buffer pool 17-3 which is provided in the transmit buffer assigning section 17 usually reserves idle buffers N12 and others. The idle buffers held in the transmit buffer pool 17-3 are supervised by the buffer assignment tables 17-1 and 17-2. Specifically, idle buffers which should be assigned to the circuit-switching-service-oriented terminal 18 such as an idle buffer N14 are managed by the table 17-1, and those which should be assigned to the packet-switching-service-oriented terminal 19 are managed by the table 17-2. In this particular embodiment, the number of buffers in each of the tables 17-1 and 17-2 which may be assigned is variable in response to the indication I from the idle buffer supervising section 15.

In operation, the processor 12 scans the receive queues 11-1 and 11-2 of the receiving section 11 at the period of t to see the numbers of process waiting buffers stored therein, i.e., queue lengths, thereby monitoring traffic generated which are individually associated with the circuit-switching-service-oriented and packet-switching-service-oriented service access points and vary every moment. The idle buffer supervising section 15 supervises the number of idle buffers stored in the common buffer pool 14, based on the idle buffer management table 15-1.

When the receiving section 11 requests idle buffers, the receive buffer assigning section 16 supplies the section 11 with buffers to temporarily store data signals which are sent from the terminal 12 or 18. Likewise, when the transmitting section 13 requests idle buffers, the transmit buffer assigning section 17 supplies the transmitting section 13 with buffers for storing data signals which are to be sent from the processor 12 to the terminal 18 or 19.

The processor 12 sequentially takes out the buffers from the queue, e.g., queue 11-1 one at a time. In this embodiment, the processor 12 takes out the buffer AR1 to apply necessary processing to a data signal which is stored in the buffer AR1. After such processing, the processor 12 returns the used buffer to the common buffer pool 14 as an idle buffer, as represented by a processed buffer AR0 in the figure.

While the procedure described so far is under way, a situation may occur in which many of the idle buffers held in the common buffer pool 14 are used due to the increase in the amount of data transmitted from the terminals 18 and 19 to the processor 12 or vice versa. As the number of idle buffers in the common buffer pool 14 becomes smaller than the predetermined number X, the idle buffer supervising section 15 detects it, step 100, FIG. 3. Then, the supervising section 15 informs the processor 12 of such an occurrence over a signal line 21, step 101, FIG. 3

Figure 2B:
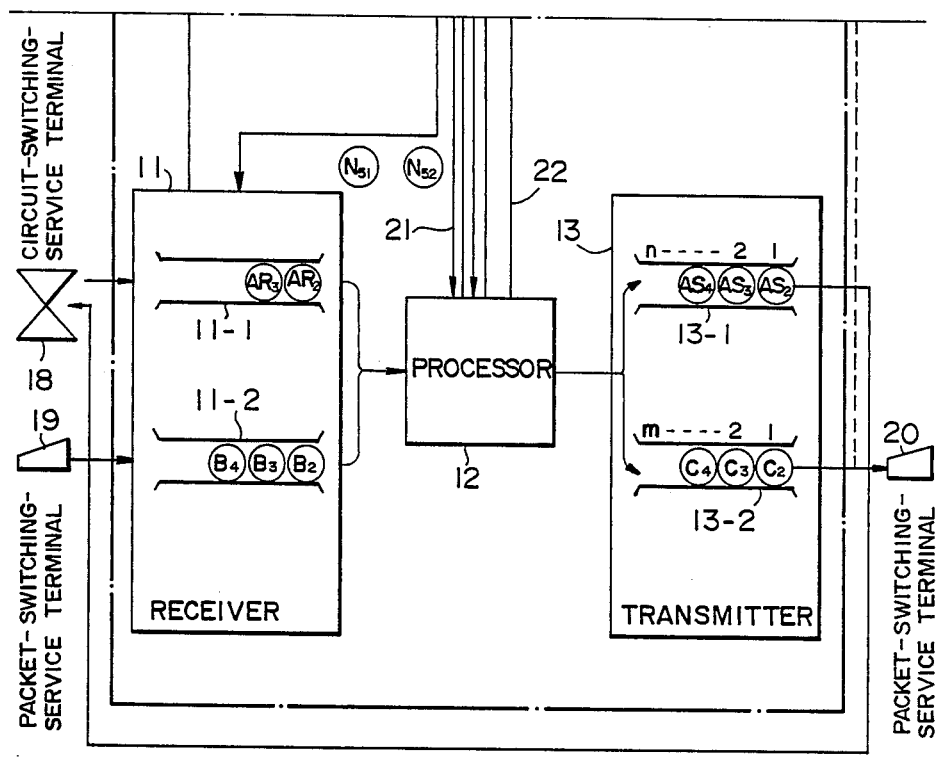
Figure 4:
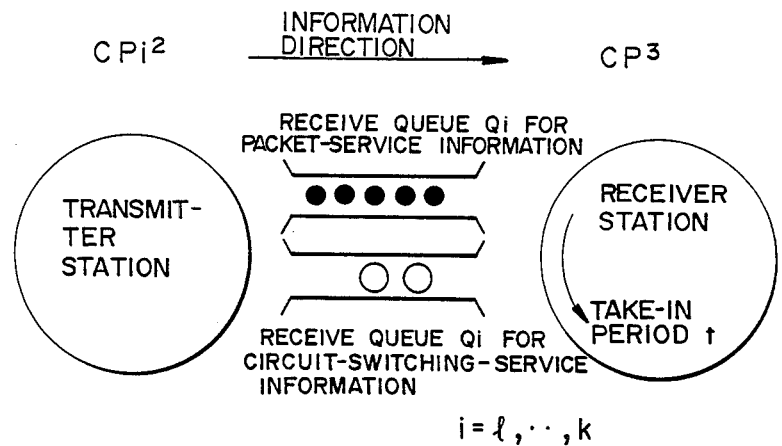
FIG. 4 is a view schematically showing the principle of a prior art individual queue type control system.
Figure 5:
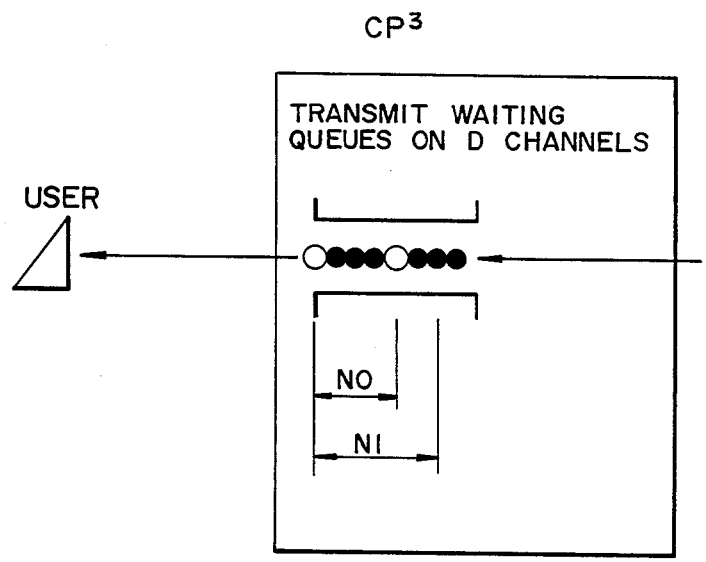
FIG. 5 is a view schematically showing the principle of another prior art control system which brackets circuit switching service data and packet switching service data together and monitors transmit waiting queue lengths on individual D channels.

In response, the processor 12 detects the lengths Qc and Qp of the receive queues 11-1 and 11-2, respectively, in the current scanning period out of the receiving section 11, then subtracts predetermined thresholds values, or bias values, Y and Z from the queue lengths Qc and Qp, respectively, and then compares the results to each other, step 102. Subsequently, the processor 12 notifies the idle buffer supervising section 15 of the service access point from among all of access points having the largest value over a signal line 22, step 103. The supervising section 15 in turn delivers the previously mentioned indication I to the receive buffer assigning section 16 and the transmit buffer assigning section 17, causing them to reduce the number of buffers which are to be assigned to the service access point from among all of the access points having the smallest value value, step 104. The resulting condition is shown in FIG. 2A and 2B.

Instructed by the supervising section 15 as stated above, the receive buffer assigning section 16 reduces the number of buffers of one of its buffer assigning tables 16-1 and 16-2 which is associated with the particular service access point having a smaller value. For example, the assigning section 16 reduces to "2" the number of buffers of the table 16-2 which is associated with the packet-switching-service-oriented terminal 19. In this example, therefore, only idle buffers N38 and N36 are held in the table 16-2, as shown in FIGS. 2A and 2B.

In the above condition, the assigning section 16 sends an receive idle buffer request for the terminal 19 to the supervising section 15 when and only when the number of idle buffers registered in the variable table 16-2 has been reduced to "2" or smaller number. This regulates the number of idle buffers which are reserved in the common buffer pool 14.

The assigning section 16 is constructed such that upon reception of an idle buffer assign request from the receiving section 11 it delivers an idle buffer request to the supervising section 15 to thereby assign idle buffers to the receiving section 11. It follows that if the number of buffers requested is greater than the number which is currently assigned for the interchange of data between the terminals 18 and 29 and the processor 12, the assigning section 16 fails to instantaneously supply the receiving section 11 with idle buffers. In this sense, changing the number of buffers of the table 16-2 which may be assigned is equivalent to controlling the waiting time before the execution of data transfer from the receiving section 11 to the processor 12. The transmit buffer assigning section 17 is operated in exactly the same manner as the receive buffer assigning section 16 by the indication I from the supervising section 15. Details of the operation of this assigning section 17 will not be described to avoid repetition.

To summarize the sequence of steps described so far, the processor 12 monitors the numbers of waiting buffers which are individually associated with the different service access points, at every period of t. As the idle buffer supervising section 15 detects the decrease of the number of idle buffers reserved in the common idle buffer pool 14 to less than the predetermined number X, the processor 12 controls the number of buffers to be assigned and processed for each of the service access points, based on a function of the current number of waiting buffers and the previously stated threshold Y or Z.

When the traffic is relaxed again after the reduction of the number of idle buffers assigned, the number of idle buffers stored in the common buffer pool 14 increases. Sensing this, the idle buffer supervising section 15 cancels the reduced idle buffer condition as instructed by the indication I. In response, each of the receive and transmit assigning sections 16 and 17, respectively, regains the originally assigned number of idle buffers, i.e., three or more idle buffers in this particular embodiment.

As stated above, by controlling the number of idle buffers available in each of the buffer assigning sections 16 and 17, two different conditions can be satisfied at the same time: strict real time operation between the arrival of a data signal from the circuit-switching-service-oriented terminal 18 at the switching system 10 and the transmission of that data signal, and transmission of data signals which are directed to the packet-switching-service-oriented terminals 19 and 20. While the number of idle buffers and that of buffers which may be assigned, which are the parameters of the system, have been described by using specific numerical values, they should be understood to be only illustrative and not restrictive. The gist is that any adequate values be selected for those parameters depending upon the design conditions of a system.

Basically, the embodiment shown and described is constructed to change the number of buffers dynamically in matching relation to the number of idle buffers. Hence, the processor 12 itself may be provided with the function of managing the number of idle buffers so as to directly supervise idle buffers. Furthermore, the present invention is effectively applicable not only a switching system but also to a communications system which transmits and receives data by the high level data link control (HDLC) protocol, e.g. VAN or LAN.

In summary, the above-described embodiment monitors the number of requests awaiting processing on a kind-by-kind basis and at every predetermined period, subtracts a different predetermined bias value from the number of each kind of current awaiting requests and, then, compares the results. By using such an algorithm, the embodiment dynamically changes the numbers of transmit and receive buffers to be assigned depending upon the number of idle buffers available. This allows data to be transmitted and received without increasing the delay time even if a switching system accommodates a circuit-switching-service-oriented terminal, on which a strict condition is imposed with respect to the time between data transmission and reception.

Figure 6:
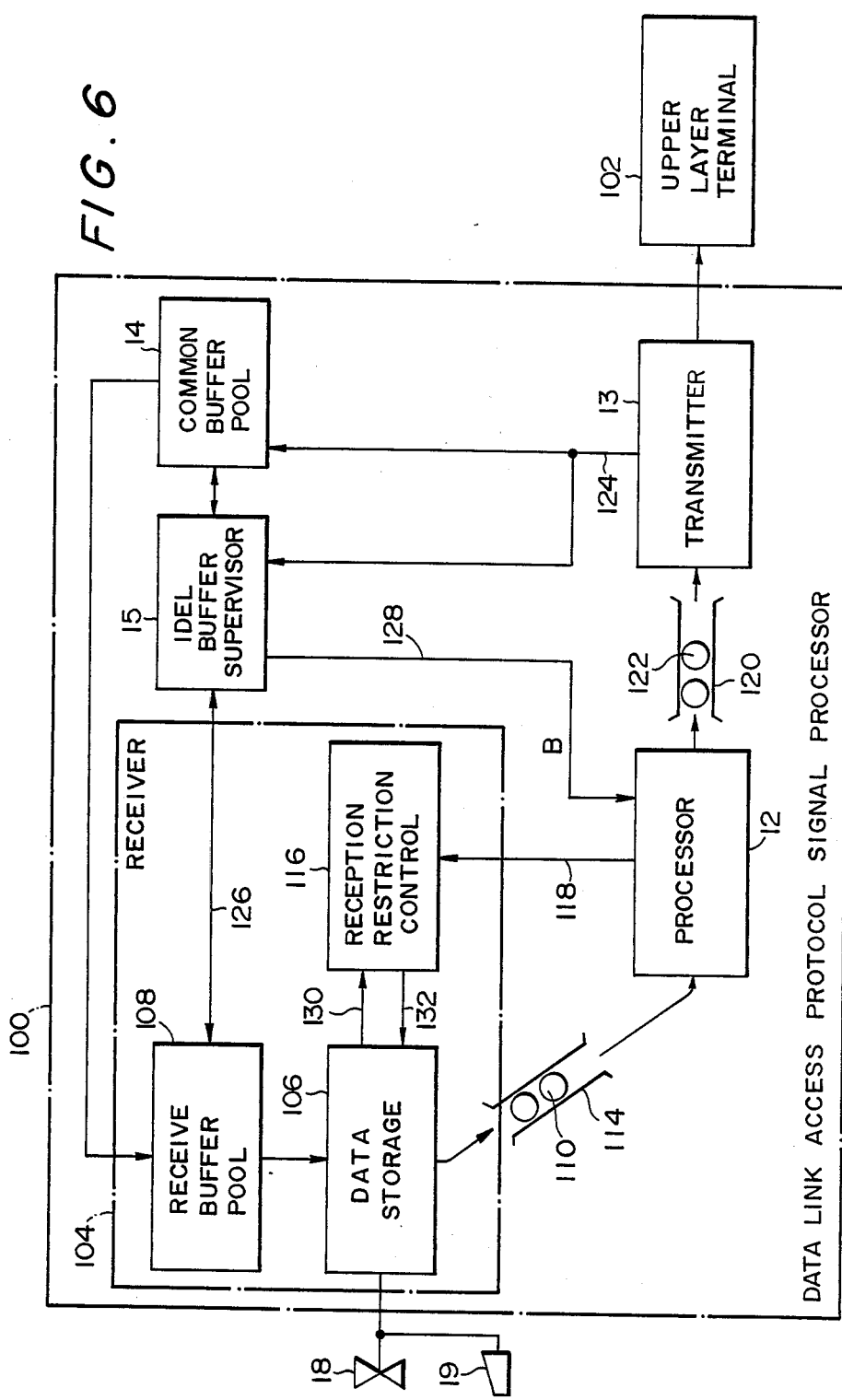
FIG. 6 is a schematic block diagram showing a data link access protocol signal processor in accordance with an alternative embodiment of the present invention.

Referring to FIG. 6, there is shown a data link access protocol signal processor for ISDN in accordance with an alternative embodiment of the present invention. So far as the basic data transmission system is concerned, the control device of FIG. 6 is analogous to the control device of FIGS 1A and 1B.

As shown in FIG. 6, a data link access protocol signal processor 100 is connected to an upper layer station 102 and, via a lower layer, to the circuit-switching-service-oriented terminal 18 and packet-switching-service-oriented terminal 19. In this particular embodiment, the signal processor 100 functions to selectively receive data signals from the terminals 18 and 19 and send them to the upper layer station 102. This function symbolizes, for example, the LAPD signal processing function of the ISDN switching system 10 as shown in FIGS. 1A and 1B. In the following figures, the same or similar structural elements as those shown in FIG. 1A and 1B are designated by like reference numerals.

The data link access signal processor 100 includes a receiving section 104 to which transmission channels from the terminals 18 and 19 are connected. The receiving section 104 plays the role of an interface for receiving data signals from the terminals 18 and 19. Specifically, the receiving section 104 includes a data storage 106 which is provided with particular areas for temporarily storing data signals that may be received from the terminals 18 and 19. Among buffer areas in the data storage 106, those which are usable as idle areas for reception are registered in a receive buffer pool 108.

The data storage 106 stores data received from and to be transmitted to the circuit-switching-service-oriented terminal 18 or the packet-switching-service-oriented terminal 19 in each of buffers 110 which are fed thereto from the receive buffer pool 108, while registering those buffers 110 in a process waiting queue 114. Such storage and waiting are regulated by a reception restricting control circuit 116 in response to a restriction value which is fed from the processor 12 to the control circuit 116 over a control line 118 and will be described in detail later.

The processor 12 processes the data registered in the queue 114 by an SDL (Specification and Description Language) procedure, converts that data into data which is suitable for the upper layer, and registers the resulting data in a transmit waiting queue 120 as a buffer 122. The transmitting section 13 transmits the data stored in the buffer 122 of the queue 120 to the upper layer station 102 while, at the same time, returning the used buffer to the common buffer pool 14 as indicated by a control line 124. The idle buffer supervising section 15 supplies the receive buffer pool 108 with idle buffers at an adequate timing in response to data 124 representative of the return of the used buffer to the common buffer pool 14 as stated above, and data 126 relating to idle buffers which are held in the common buffer pool 14 and receive buffer pool 108. The supervising section 15 monitors the condition of idle buffers which are held in the receive buffer pool 108, at an adequate timing and through the control line 126. The condition of idle buffers being monitored is reported to the processor 12 over a line 128 in a form of the number of idle buffers B in the receive buffer pool 108 per unit time.

Figure 7:
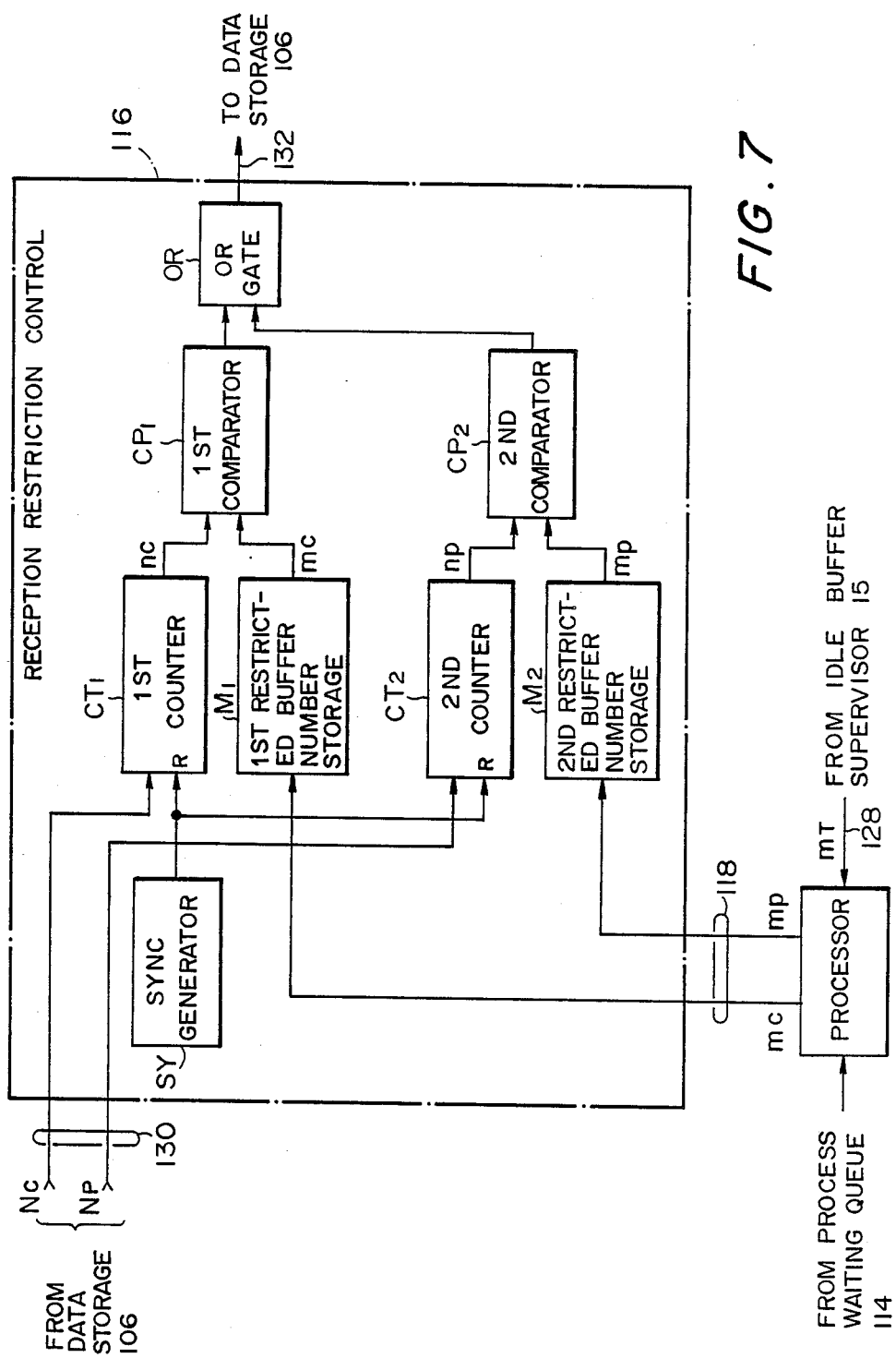
FIGS. 7 and 8 are schematic block diagrams each showing a specific construction of a reception restricting control circuit which is included in the embodiment of FIG. 6.

As shown in detail in FIG. 7, the reception restriction control circuit 116 includes a first counter CT1 which monitors through a control line 130 the number Nc of buffers being occupied by data signals which the data storage 106 has received from the circuit-switching-service-oriented terminal 18, thereby determining the number nc of buffers used per unit time. Likewise, a second counter CT2 also included in the control circuit 116 monitors through a control line 130 the number Np of buffers being occupied by data signals which the data storage 106 has received from the packet-switching-service-oriented terminal 19, whereby the number np of buffers used per unit time is determined. A synchronizing signal generating circuit, or sync generator, SY is connected to the counters CT1 and CT2 so as to apply a synchronizing signal to the reset terminals of the counters CT1 and CT2 at every predetermined period, thereby defining the above-stated unit time.

The number of buffers to be assigned to the circuit-switching-service-oriented terminal 18 is regulated by a first restricted buffer number storage M1. Functioning as a receive buffer assigning means, the storage M1 stores upper limits of the number nc of buffers used per unit time one after another as restriction values mc and in response to an instruction which is fed from the processor 12 over the control line 118. In the same manner, a second restricted buffer number storage M2 which functions as a receive buffer assigning means associated with the terminal 19 stores the upper limits of the number np of buffers used per unit time one after another as restriction values mp and in response to an instruction from the processor 12. The restriction values mc and mp are each defined by the processor 12 in terms of a value per unit time of their associated counter CT1 or CT2 depending upon the number of data to be processed per unit processing time for the buffers 110 which are held in the queue 114, with priority given to the value mc over the value mp and in consideration of the traffics of the terminals 18 and 19. In this instance, the sum (mc+mp) of the restriction values is controlled to be smaller than the number mT of idle buffers per unit time which is produced by the idle buffer supervising section 15.

A first comparator CP1 compares the count nc relating to the terminal 18 with the restriction value mc and, if nc is smaller than mc, produces a (logical) ONE while, if nc is equal to or greater than mc, producing a (logical) ZERO. Likewise, a second comparator CP2 compares the count np relating to the terminal 19 with the restriction value mp, producing a ONE if the former is smaller than the latter and a ZERO if the former is equal to or greater than the latter.

The logical outputs of the comparators CP1 and CP2 mentioned above are connected to the inputs of an OR gate OR. When the output of the OR gate OR is a ONE, a store enable flag is applied from the OR gate OR to the data storage 106 for causing the latter to store the corresponding data signal in an idle buffer. When the output of the OR gate OR is a ZERO, a store inhibit flag is applied to the data storage 106.

A major part of the operation of the system shown in FIGS. 6 and 7 is as follows. Upon the start of operation of the system, initial value of the restricted buffer numbers mc and mp are applied to the restricted buffer number storage units M1 and M2, respectively. When a data signal received from the circuit-switching-oriented terminal 18 or the packet-switching-service-oriented terminal 19 is fed to the data storage 106; the data storage 106 fetches an idle buffer from the receive buffer pool 108 to store the incoming data signal in that idle buffer. The counters CT1 and CT2 count, respectively, the number Nc of buffers which have been occupied by data signals from the terminal 18 and the number Np of buffers which have been occupied by data signals from the other terminal 19. The counters CT1 and CT2 deliver the resulting numbers nc and np of buffers user per unit time to the comparators CP1 and CP2, respectively. Each of the comparators CP1 and CP2 continuously produces a ONE while its associated count nc or mc is smaller than the restriction value mc or mp, causing the OR gate OR to produce a ONE on its output 132. In response, the data storage 106 sequentially stores data signals in idle buffers in the order of reception. The processor 12 loads the storage units M1 and M2 with the restriction values mc and mp, respectively, one after another based on the number of buffers in the receive waiting queue 114 which were processed and other factors.

When any one of the comparators CP1 and CP2 decides that the actual count has reached the restriction value, it produces a ZERO. When both the comparators CP1 and CP2 produce a ZERO, the output 132 of the OR gate OR becomes a ZERO inhibiting the data storage 106 from storing data signals from any of the terminals 18 and 19.

The processor 12 sequentially takes out, analyzes and processes the data signals which are held in the process waiting queue 114, and then feeds them to the transmit waiting queue 120. The transmitting section 13 sequentially accesses the buffers 122 in the transmit waiting queue 120, transmits the data signals stored in those buffers 122 to the upper layer station 102, returns the used buffers to the common buffer pool 14, and notifies the idle buffer supervising section 15 of the return of the used buffers.

Figure 8:
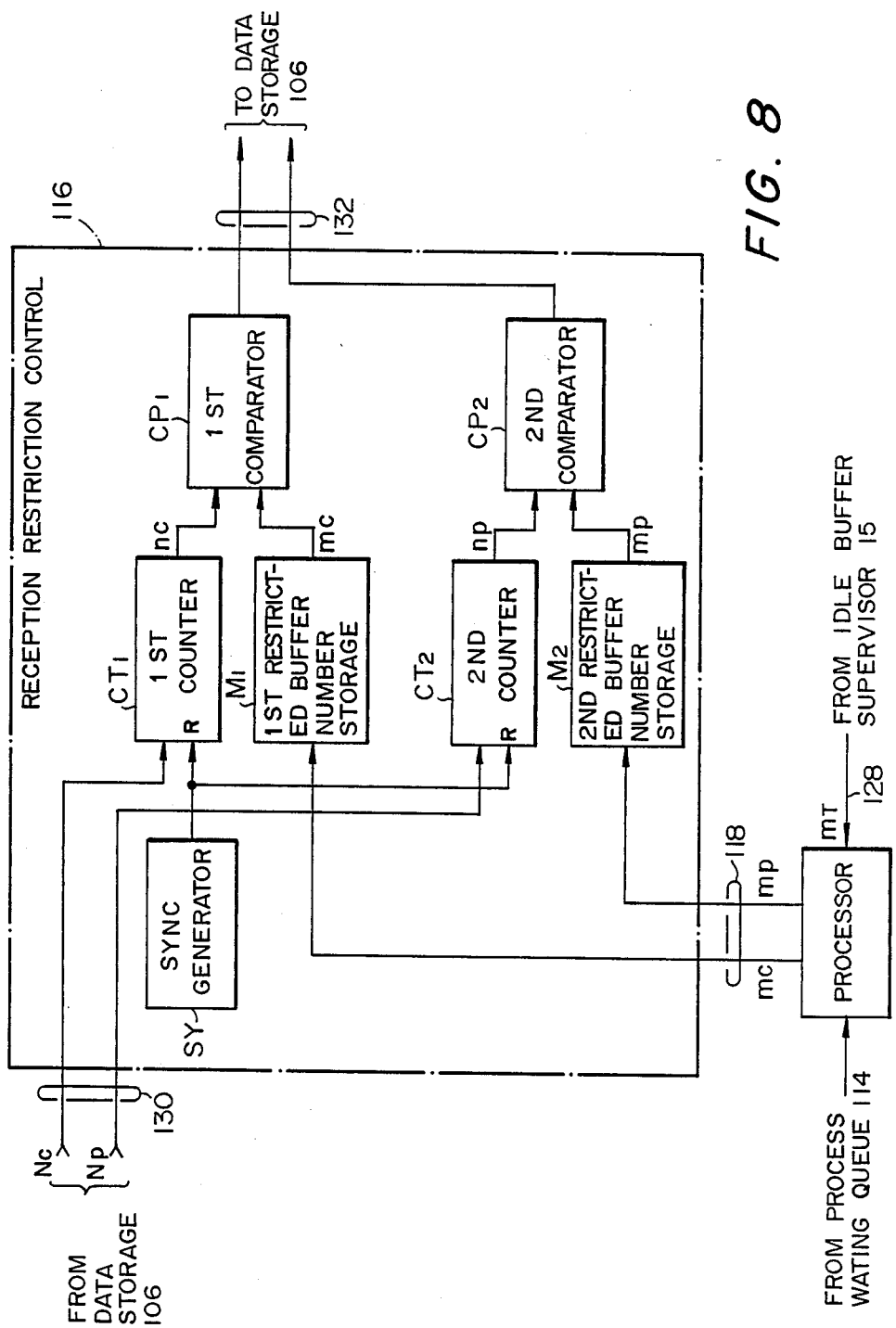

Referring to FIG. 8, another specific construction of the reception restriction control circuit 116 is shown. The control circuit shown in FIG. 8 is essentially similar to that of FIG. 7 except that the outputs of the comparators CP1 and CP2 are directly connected to the output lines 132 which lead to the data storage 106. In FIG. 8, when any one of the comparators CP1 and CP2 determines that the actual count has reached the restriction value, it produces a ZERO. This ZERO output, or store inhibit flag, is directly applied to the data storage 106 via one of the output lines 132 which extends from that particular comparator CP1 or CP2. The data storage 106 responds to the store inhibit flag 106 by inhibiting the storage of data signals from one of the terminals 18 and 19, which belongs to a service group associated with that flag, in the buffer area of the data storage 106. In this manner, the control circuit shown in FIG. 8 is capable of effecting delicate traffic control depending upon the service group to which the terminal 18 or 19 belongs, i.e., a circuit-switching-service-oriented terminal or a packet-switching-service-oriented terminal in this particular embodiment.

In the alternative embodiments described above, too, an arrangement may be made such that the processor 12 itself controls the number of idle buffers without the intermediary of the idle buffers supervising section 15.

Since the above embodiments are operated by the high level data link control protocol, it is similarly applicable to VAN, LAN and other data transmission and reception systems.

As described above, in accordance with the alternative embodiments shown and described, the number of buffers occupied by transmit and receive data per predetermined period is constantly monitored on a terminal basis so as to prevent if from exceeding a restriction value which is particular to its associated terminal. Hence, by adequately selecting the restriction value, it is possible to transmit and receive data smoothly without entailing any increase in delay time even in the case of a circuit-switching-service-oriented terminal and others which involve strict time conditions.

Figure 9:
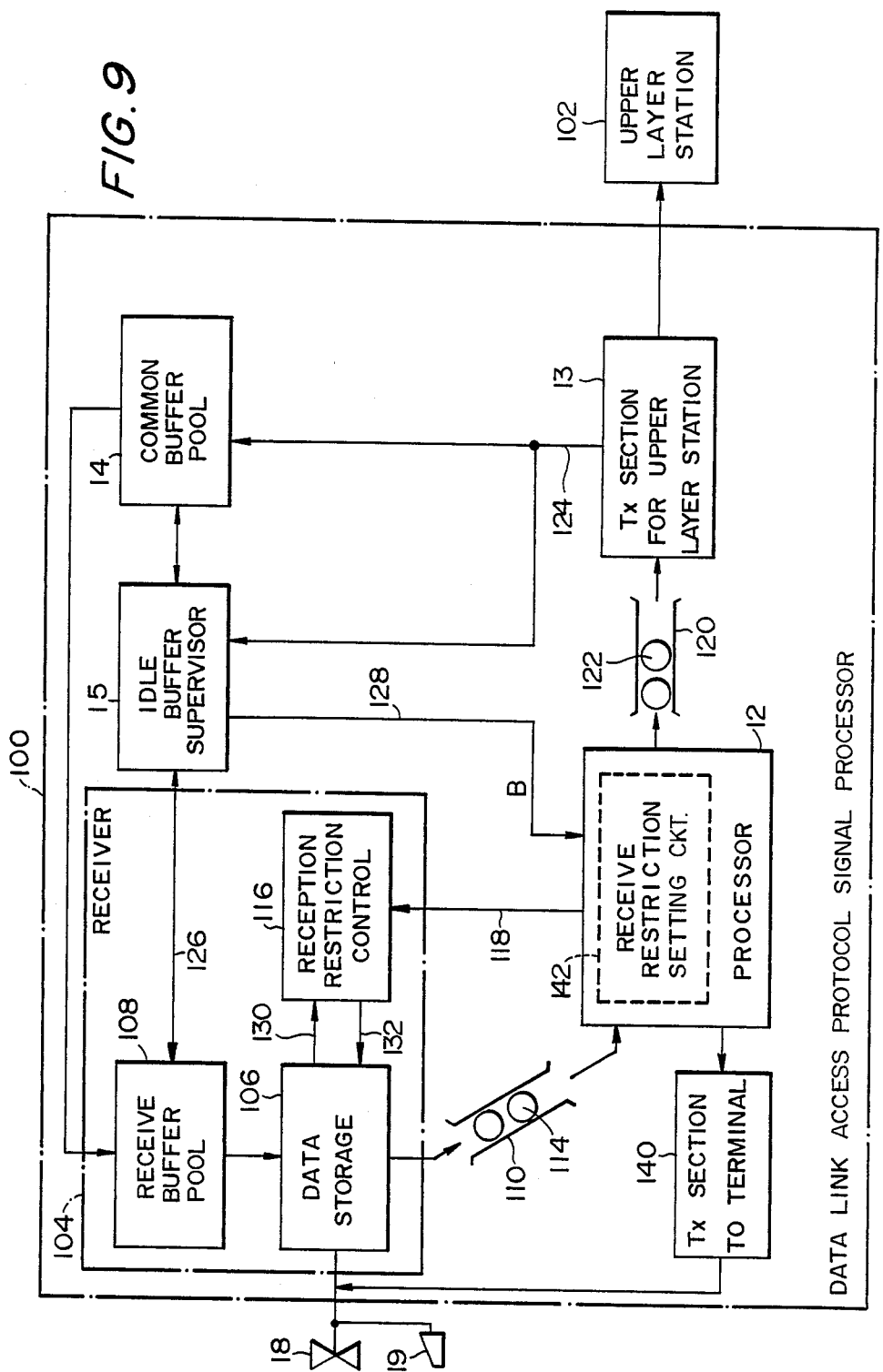
FIG. 9 is a schematic block diagram showing a data link access protocol control in accordance with still another embodiment of the present invention.

Referring to FIG. 9, still another embodiment of the present invention is shown. The data link access signal processor in accordance with this embodiment, too, is capable of accommodating a plurality of different kinds of terminals, such as the circuit-switching-service-oriented terminal 18 and the packet-switching-service-oriented terminal 19. As shown, a transmitting section 140 is provided for allowing data signals to be transmitted from the controller 100 to the terminals 18 and 19. Specifically, transmission lines adapted for the transmission of data signals to the terminals 18 and 19 are connected to the transmitting section 140 which serves as a transmit interface.

The processor 12 is provided with a restriction setting circuit 142 therein. This circuit 142 includes a restriction state variable, i.e., a restrict flag r for regulating the number of receive buffers which may be used by the terminals 18 and 19. The restrict flag r assumes "0" in a normal or non-restriction state, "1" in a first restriction state, and "2" in a second restriction state. The transition between those three different stages of restriction is controlled based on the number B of idle buffers which is informed of by the idle buffer supervising section 15.

FIG. 10 shows various conditions relating to the supervision over the restriction inclusive of the above-stated transitions between the three restriction stages. FIG. 11 schematically shows conditions for the transition between the normal, first, and second restriction states. In these figures, w, x, y and z are threshold values each of which is representative of a predetermined reference number of buffers to be compared with the actual number B of idle buffers, the threshold values being related as $z > y > x > w$. Specifically, the threshold value w defines a transition from the first restriction state $r = 1$ to the second restriction from state $r = 2$ when it is equal to or greater than the idle buffer number B. The threshold value x defines a transition from the second restriction state $r = 2$ to the first restriction state $r = 1$ when it is smaller than the idle buffer number B. The threshold value y defines a transition from the normal state $r = 0$ to the first restriction state $r = 1$ when it is equal to or greater than the idle buffer number B. Further, the threshold value z defines a transition from the first restriction state $r = 1$ to the normal state $r = 0$ when it is smaller than the idle buffer number B.

In the restriction setting circuit 142 of the processor 12, there are defined the numbers $mc_i$ and $mp_i$ (i being 0, 1 and 2 which correspond to the values of r) of receive buffers which are to be used per unit time in receiving data signals from the circuit-switching-service-oriented terminal 18 and packet-switching-service-oriented terminal 19, respectively, constituting the restriction values for the three restriction levels $r = 0$, $r = 1$ and $r = 2$. The restriction setting circuit 142 delivers to the reception restriction control circuit 116 via the control line 118 paired restriction values $mc_0$ and $mp_0$, $mc_1$ and $mp_1$, and $mc_2$ and $mp_2$ under the conditions $r = 0$, $r = 1$ and $r = 2$, respectively.

Further, when a transition from the normal state $r = 0$ to the first or second restriction state $r = 1$ or $r = 2$ occurs, the restriction setting circuit 142 sends to the terminals 18 and 19 an unable-to-receive, or receive restriction, notice RNR via the transmitting section 140. Likewise, in the event of a transition to the normal state $r = 0$, the circuit 142 sends an able-to-receive, or restriction removal, notice RR to the terminals 18 and 19. To the upper layer station 102, the circuit 142 sends an occupied, or transmit restriction, notice BUSY in the event of a transition from the normal state $r = 0$ or the first restriction state $r = 1$ to the second restriction state $r = 2$ via the transmitting section 13, while sending a non-occupied, or restriction cancellation, notice BUSY CANCEL in the event of a transition to the usual state $r = 0$.

A reference will now be made to FIGS. 12A, 12B and 12C for describing the procedure for restricting the number of receive buffers which is mainly executed by the processor 12 of FIG. 9.

Figure 12A:
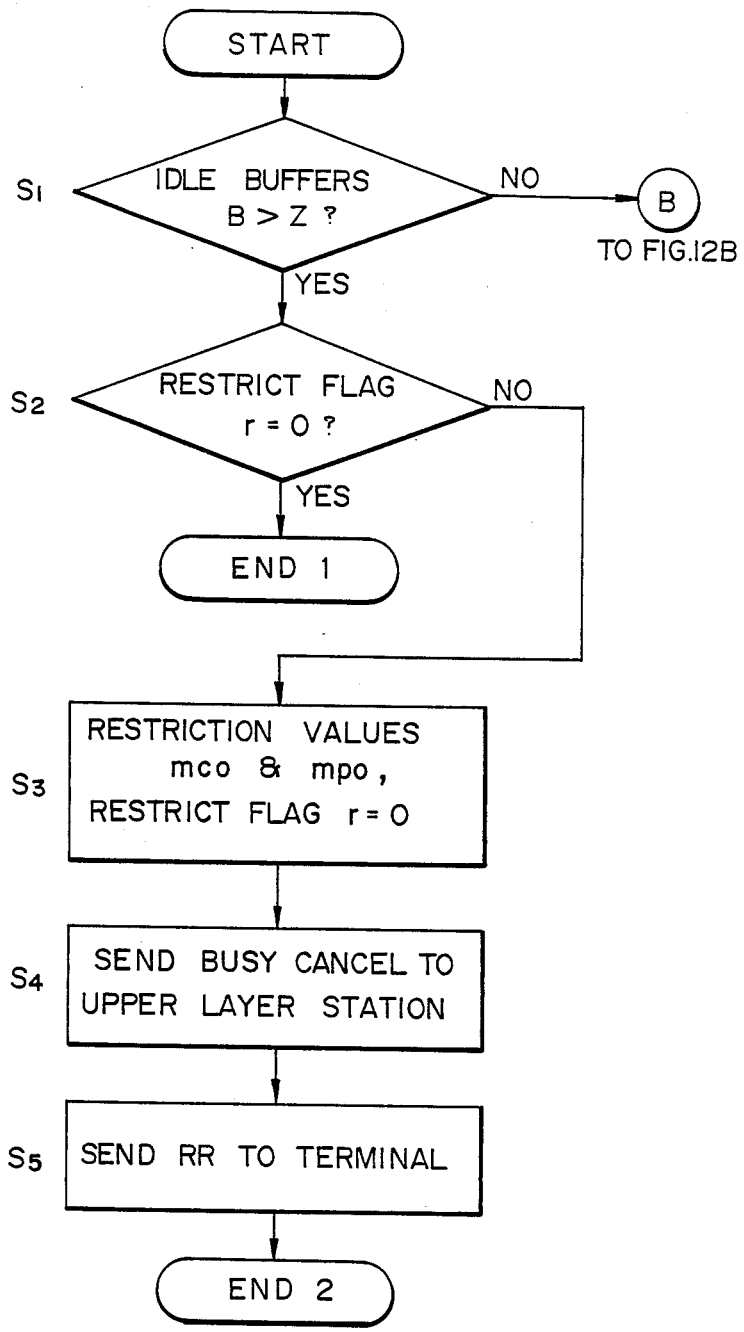
Figure 12B:
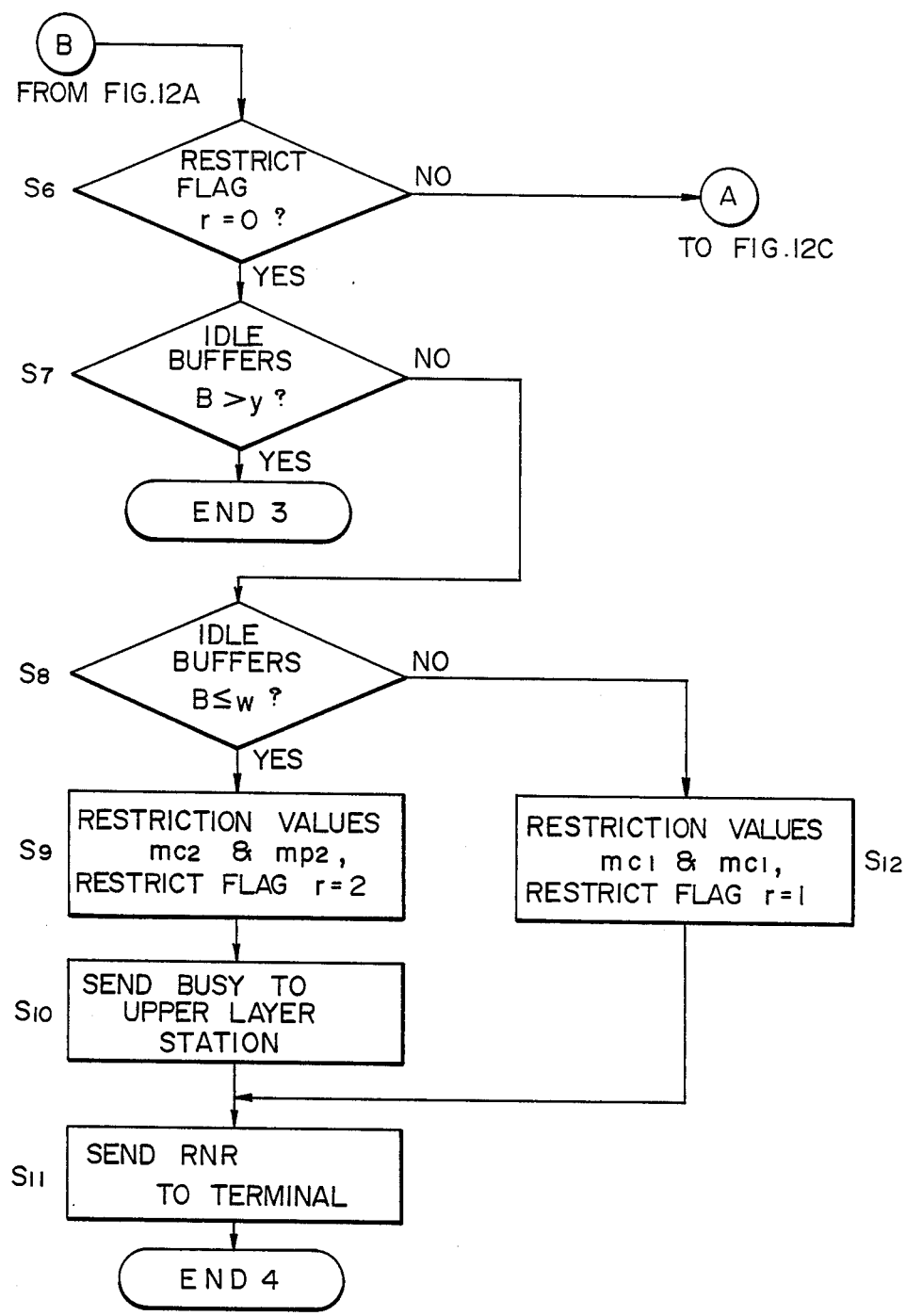

In FIG. 12A, the flow constituted by steps S1, S2 and END 1 is representative of a condition wherein the normal state $r = 0$ continues imposing no restriction on the number of buffers to be used by the terminals 18 and 19. More specifically, the usual state continues so long as the threshold z remains smaller than the idle buffer number B as produced by the idle buffer supervising section 15 (step S1) and the restrict flag r is "0" (S2), continuously applying restriction values $mc_0$ and $mp_0$ (no restriction) to the reception restriction control circuit 116.

The route extending from the step S1 to END 2 by way of the step S2 and steps S3, S4 and S5 shows a transition from the first restriction state $r = 1$ or the second restriction state $r = 2$ to the normal state $r = 0$. Since the idle buffer number B is at a level for tightening the restriction toward the normal state $r = 0$ (S1) and since the restrict flag r is "1" or "2" (S2), the restriction values $mc_0$ and $mp_0$ are loaded to establish the normal state $r = 2$ (S3). Thereupon, the restriction cancellation notice BUSY CANCEL is fed to the upper layer station 102 (S4), and the restriction removal notice RR is sent to the terminals 18 and 19 (S5).

The route extending from the step S1 to END 3 by way of steps S6 and S7, like the route which terminates at END 1, demonstrates a condition wherein the normal state r=0 is maintained.

The route extending from the step S1 to END 44 through the steps S6 and S7 and steps S8 to S11 is representative of a transition from the normal state r=0 to the second restriction state r=2. Specifically, if the restrict flag r is "0" (S6) and the idle buffer number B is equal to or smaller than the threshold value w (S8), restriction values mc2 and mp2 are set to establish the second regulation state r=2 (S9). Thereafter, the transmit restriction notice BUSY is sent to the upper layer station 102 (S10), and the receive restriction notice RNR is sent to the terminals 18 and 19 (S11).

The route extending from the step S1 to END 4 through the steps S6 to S8, a step S12 and the step S11 shows a transition from the normal state r=0 to the first restriction state r=1, in which restriction values mc1 and mp1 are loaded (S12). Then, the receive restriction notice RNR is transmitted to the terminals 18 and 19 (S11).

The steps S1 and S6 and steps S13, S14 and END 5, FIG. 12C, are representative of a condition wherein the first restriction state r=1 is maintained to feed the restriction values mc1 and mp1.

The steps S1, S6, S13 to S14, and steps S15 and END 6, FIG. 12C, constitute a flow in which a transition from the second restriction state r=2 to the first restriction state r=1 occurs. Specifically, if the idle buffer number B is greater than the threshold value x (S13) and the restrict flag r is "2" (S14), the restriction values mc1 and mp1 are set.

The steps S1, S6, S13 and steps S16 and END 7 show a condition in which either the first restriction state r=1 or the second restriction state r=2 continues and, therefore, the restriction values mc2 and mp2 are fed out depending upon the preceding state.

The steps S1, S6, S13 and S16 and steps 17 and END 8 constitute a flow in which the second restriction state r=2 continues and, therefore, the restriction values mc2 and mp2 are delivered.

Further, the steps S1, S6, S13, S16 and S17 and steps S18, S19 and END 9 complete a route in which a transition from the first restriction state r=1 to the second restriction state r=2 occurs. By this flow, therefore, the restriction values mc2 and mp2 are set while, at the same time, the restrict flag r is changed to "2" (S18), followed by sending the transmit restriction notice BUSY to the upper layer station 102.

In summary, in accordance with this embodiment, the number of idle buffers which are shared by different service groups is monitored and, depending upon its relationship with a common predetermined number of idle buffers, matched to different restriction stages. This, coupled with the fact that restriction values are defined on a service group basis, simplifies the control and, yet, allows the control to be effected with priority order defined on a service group basis. Further, the control is table because the threshold value for the transition from one restriction stage to another in the tightening direction is selected to be smaller than that for the transition in the relaxing direction with respect to the number of idle buffers. In addition, since the number of idle buffers per unit time is constantly monitored, control with rapid response is attainable which corresponds even to tiny fractions of time.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A system for supervising assignment of buffers for individually temporarily storing data signals therein which are received from and are to be transmitted to a communication apparatus of a type performing D channel data link access protocol signal processing as defined by CCITT Recommendations pertaining to a user-to-network interface of an integrated service digital network, said system comprising:
   a processing means for processing the data signals which are temporarily stored in the buffers:
   a first buffer assigning means for assigning receive buffers, which individually temporarily store received data signals which must wait until processed by said processing means, to said received data signals for respective service access points;
   a second buffer assigning means for assigning transmit buffers, which individually temporarily store data signals which have been processed by said processing means and must wait until transmitted, to said processed data signals for respective service access points;
   an idle buffer reserving means shared by said first and second buffer assigning means for reserving idle buffers therein; and
   a supervising means for supervising the number of receive buffers to be assigned by said first buffer assigning means and the number of transmit buffers to be assigned by said second buffer assigning means depending upon the number of idle buffers which have been reserved by said idle buffer reserving means;
   wherein said processing means monitors, for the respective service access points, the number of receive buffers which store the data signals waiting to be processed and the number of transmit buffers which store the data signals waiting to be transmitted, at a predetermined period, and, when said supervising means has detected that the number of idle buffers reserved by said idle buffer reserving means has decreased to a value which is less than a first predetermined value, wherein said processing means controls the number of buffers which are to be reserved for the receive and transmit buffers, for the respective service access points, depending upon a function of a current number of waiting buffers and a predetermined threshold.

2. A system in accordance with claim 1, wherein when said supervising means has detected that the number of idle buffers reserved by said idle buffer reserving means has decreased to a value which is less than said first predetermined value, said processing means produces a difference between the current number of waiting buffers and the predetermined threshold for the respective service access points and, then compares resulting differences to each other;
   wherein said supervising means, in response to a result of the comparison performed by said processing means, reduces the number of idle buffers which are to be assigned to the data signals received for the service access point to a second predetermined value, said access point being selected from among all of said access points which has the smallest difference.

3. A system in accordance with claim 1, wherein said supervising means counts the number of idle buffers which are associated with said first buffer assigning means;

said system further comprising reception restricting means which is provided with a plurality of levels of restriction value, said reception restricting means comparing the number of idle buffers counted by said supervising means to said plurality of levels of restriction value for each of the service access points and, then, restricting the number of receive buffers available for reception of data signals from said service access point to a second predetermined value of the plurality of levels which is associated with a result of the comparison.

4. A system in accordance with claim 3, wherein the value of the plurality of levels is smaller for a transition from a relaxed restriction level to a tightened restriction level than for a transition from the tightened restriction level to the relaxed restriction level with respect to the number of idle buffers.

5. A system in accordance with claim 3, wherein said supervising means counts the number of idle buffers per unit period of time;

in said reception restricting means, the value of the plurality of levels being defined in terms of the number of buffers per unit period of time.

6. A system in accordance with claim 1, wherein said supervising means counts the number of idle buffers which are associated with said first buffer assigning means;

said system further comprising reception restricting means which is provided with a restriction value, said reception restricting means comparing the number of idle buffers counted by said supervising means with said restriction value for each of the service access points and, when said number of idle buffers has become smaller than said restriction value, restricting the number of receive buffers available for reception of data signals from said service access point to a second predetermined value.

7. A system in accordance with claim 6, wherein said supervising means counts the number of buffers per unit period of time;

in said reception restricting means, the restriction value being defined in terms of the number of buffers per unit period of time.

8. A system in accordance with claim 7, wherein said reception restricting means comprises:

at least one counter means provided in association with the service access point for counting the number of buffers per unit period of time used for storing data signals which are received in relation to said service access point;

restriction value setting means provided in association with said at least tone counter means for storing the restriction value in terms of the number of buffers per unit period of time; and comparator means provided in association with said restriction value setting means for comparing the number output by said associated counter means with the restriction value stored in said restriction value setting means and, when said number has reached said restriction value, producing a first signal;

said first buffer assigning means, in response to said first signal, inhibiting assignment of idle buffers to received data signals.

9. A system in accordance with claim 8, wherein in response to the first signal said first buffer assigning means inhibits assignment of idle buffers to data signals which are received in relation to the service access point which is associated with said first signal.

10. A system in accordance with claim 1, wherein the service access points include a circuit-switching-service-oriented terminal.

11. A system in accordance with claim 1, wherein the service access points include a packet-switching-service-oriented terminal.

12. A system for supervising assignment of buffers for individually temporarily storing for a processing purpose data signals which a communication apparatus of a type performing data link access protocol signal processing transmits and receives, comprising:

buffer assigning means for assigning receive buffers, which individually temporarily store received data signals which wait until fed for processing, to said received data signals for each of service access points;

buffer reserving means for reserving idle buffers;

supervising means for supervising the number of buffers to be assigned by said buffer assigning means by counting a number of buffers per unit period of time which are reserved in said buffer reserving means; and reception restricting means provided with a plurality of level of restriction value, said reception restricting means comparing the number of idle buffers counted by said supervising means with the plurality of levels of restriction value for each of the service access points and, then, restricting the number of receive buffers, which individually receive data signals from said service access point, to a second predetermined value which is associated with a result of said comparison;

said plurality of different levels of restriction value which are smaller for a transition from a relaxed restriction level to a tightened restriction level than for a transition from said tightened restriction level to said relaxed restriction level with respect to the number of idle buffers.

13. A system for supervising assignment of buffers for individually temporarily storing for a processing purpose data signals which a communication apparatus of a type performing data link access protocol signal processing transmits and receives, comprising:

buffer assigning means for assigning receive buffers, which individually temporarily store received data signals which wait until fed for the processing, to said received data signals for each of service access points;

buffer reserving means for reserving idle buffers;

supervising means for supervising the number of buffers to be assigned by said buffer assigning means by counting the number of buffers per unit period of time which are reserved in said buffer reserving means;

at least one counter means provided in association with the service access point for counting the number of buffers per unit period of time which are used to store data signals received in relation to said service access point;

restriction value setting means provided in association with said at least one counter means for storing a restriction value in terms of the number of buffers per unit period of time; and comparator means provided in association with said restriction value setting means for comparing a count output by said associated counter means with the restriction value stored in said restriction value setting means and, when said count has reached said restriction value, producing a first signal;

said buffer assigning means inhibiting assignment of idle buffers to received data signals in response to said first signal.

* * * * *